United States Patent [19]

Louk

[11] Patent Number: 4,718,192
[45] Date of Patent: Jan. 12, 1988

[54] HYDROMECHANICAL BAIT TRAP

[76] Inventor: Robert L. Louk, 2013 Hastings Rd., Gautier, Miss. 39553

[21] Appl. No.: 26,287

[22] Filed: Mar. 16, 1987

[51] Int. Cl.⁴ ............................................. A01K 69/06
[52] U.S. Cl. .......................................... 43/100; 43/4.5
[58] Field of Search .................. 43/4.5, 100, 101, 102, 43/103, 104; 119/2

[56] References Cited

U.S. PATENT DOCUMENTS

| | | |
|---|---|---|
| 769,910 | 9/1904 | Melbye . |
| 2,663,117 | 12/1953 | Ederer .................................. 43/100 |
| 3,638,346 | 2/1972 | Stein ..................................... 43/102 |
| 3,661,119 | 5/1972 | Sanders . |
| 4,434,572 | 3/1984 | Sheldon . |
| 4,551,938 | 11/1985 | Sheldon et al. ......................... 43/4.5 |
| 4,554,759 | 11/1985 | Edling et al. .......................... 43/100 |
| 4,563,830 | 1/1986 | Cain . |
| 4,566,218 | 1/1986 | Kurosawa . |

*Primary Examiner*—M. Jordan
*Attorney, Agent, or Firm*—Fleit, Jacobson, Cohn & Price

[57] ABSTRACT

A conduit assembly is provided including a "field" of prearranged conduit sections or runs and the conduit assembly includes inlet and outlet ends. The conduit assembly is designed to be supported adjacent the bottom of a shallow pond and includes a partially submerged mesh sump into whose lower portion the inlet end of the conduit assembly opens and the outlet end of the conduit assembly 18 discharges downwardly into the sump, the sump being adapted to receive ground or finely cut-up bait. A pump is serially connected in the inlet end and the conduit sections comprising the "field" include a plurality of lateral branches opening into the runs and mounted therefrom for annular displacement thereabout between lower generally horizontal positions and upstanding upright positions projecting above the pond water level. The free ends of the lateral branches include marine life trap structures and structure is provided for simultaneously raising and lowering the lateral branches.

10 Claims, 7 Drawing Figures

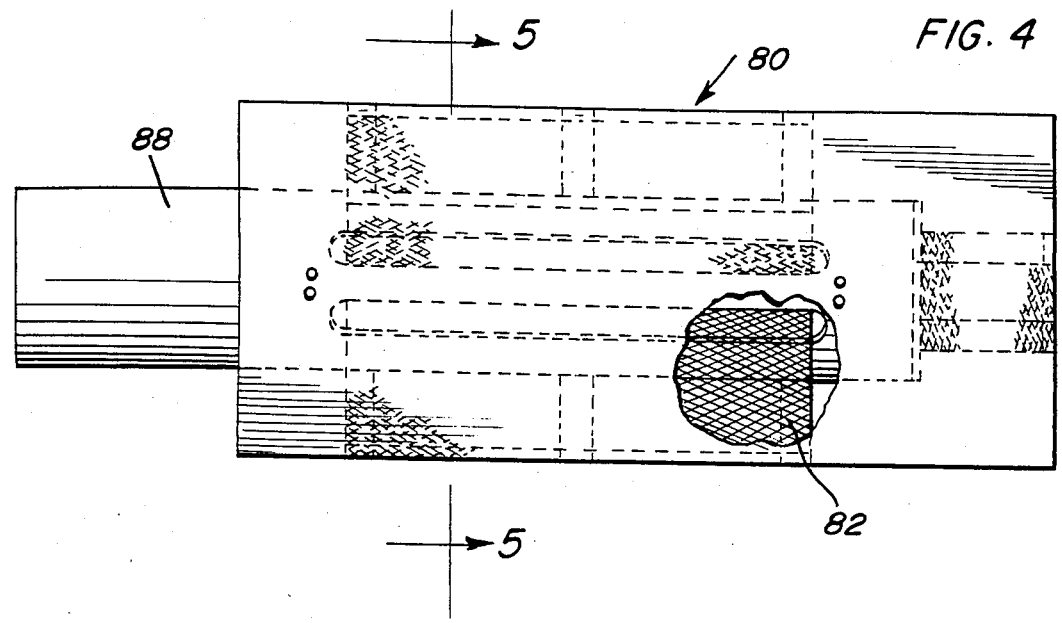
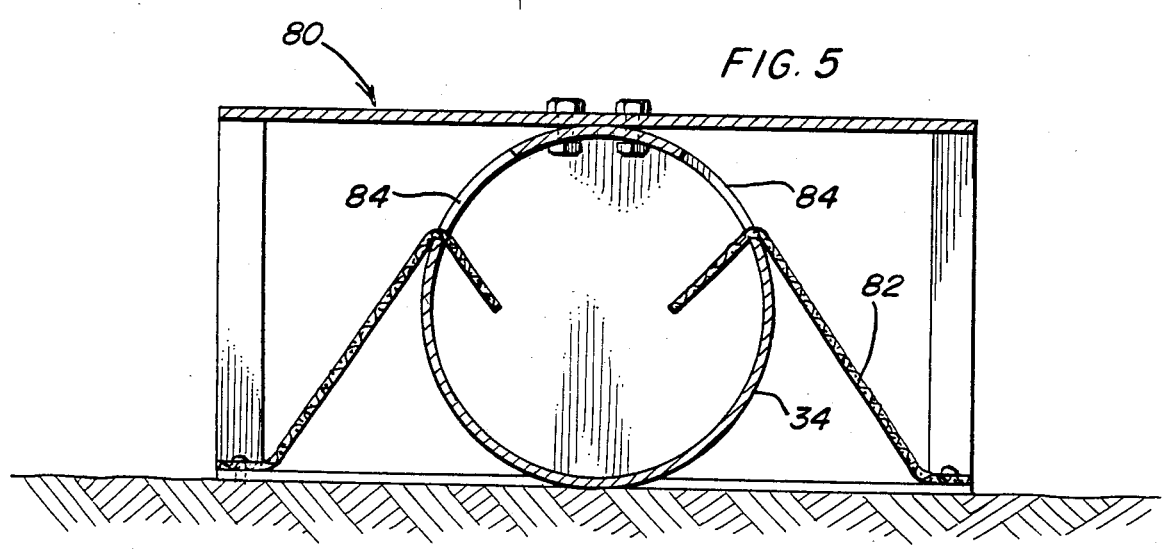
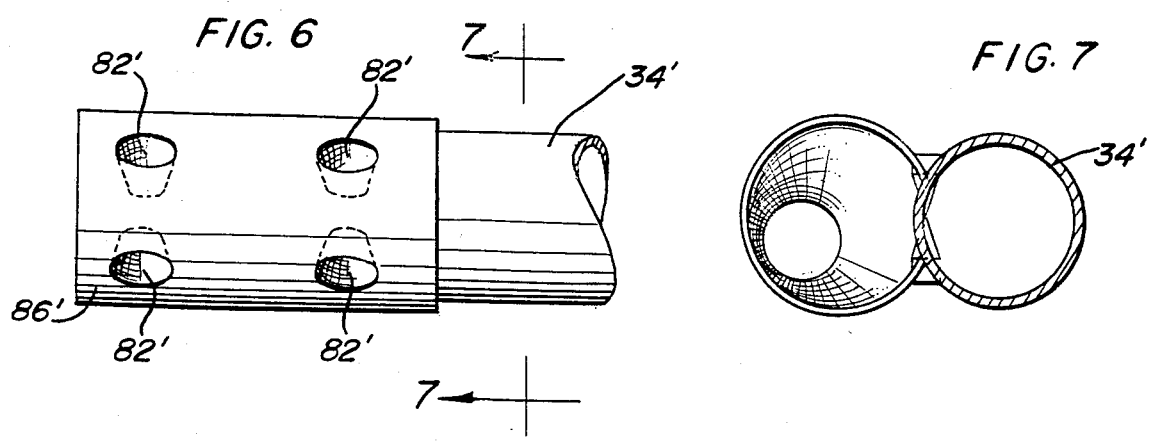

HYDROMECHANICAL BAIT TRAP

BACKGROUND OF THE INVENTION

1. Field of the Invention

This invention relates to an apparatus by which a plurality of marine life traps within a pond for raising marine life may be baited for trapping marine life therein and subsequently emptied in a manner conveying the trapped marine life to a remote location comprising the same location from which the traps were initially baited. The marine life trapping system is primarily designed for use in conjunction with crayfish, but also may be used for shrimp and minnows, etc. Further, the system is not limited to use in pools or ponds, but also may be used in streams and in different bodies of salt water.

2. Description of Related Art

Various different forms of marine life traps, harvesting and processing apparatus as well as marine life retrieving apparatuses heretofore have been known. Examples of these previously known forms of devices including some of the general structural and operational features of the instant invention are disclosed in U.S. Pat. Nos. 7,769,910, 2,663,117, 3,661,119, 4,434,572, 4,554,579 and 4,563,380. However, these previously known forms of marine life handling devices do not include the overall combination of structural features disclosed herein.

SUMMARY OF THE INVENTION

This invention relates to an apparatus for baiting and emptying marine life traps such as crayfish traps and wherein the traps may be baited from a remote location and emptied into the remote location.

The main object of this invention is to provide a marine life trapping system which may be utilized to trap and retrieve marine life from traps in an effective manner.

Another object of this invention is to provide a marine life trapping system wherein a plurality of spaced apart in-water traps may be baited from a remote location and wherein the marine life subsequently trapped in those traps may be emptied therefrom and conveyed to the same remote location.

Yet another object of this invention is to provide a marine life trap system incorporating features which enable a plurality of traps to be simultaneously baited and the same plurality of traps to be simultaneously emptied of the marine life trapped therein and with the marine life emptied from the traps conveyed to a remote location.

Another important object of this invention is to provide a marine life trap system incorporating relatively inexpensive and readily operable components.

A still further object of this invention is to provide a trap system which may be readily constructed of different sizes for use in different size ponds or other bodies of water.

A further object of this invention is to provide a trap system which may be readily dismantled in one location, transported to a second location, and subsequently erected in th second location.

Another object of this invention is to provide a trap system which may be quickly baited and have the traps thereof quickly emptied in a manner operative to convey the trapped marine life to a central collection point.

A final object of this invention to be specifically enumerated herein is to provide a marine life trap system for use in different types of bodies of water and which will conform to conventional forms of manufacture, be of simple construction and easy to use so as to provide a device that will be economical feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is an enlarged top plan view of one of the trap portions of the invention;

FIG. 5 is an enlarged vertical sectional view taken substantially upon the plane indicated by the section line 5—5 of FIG. 4;

FIG. 6 is a side elevational view of an alternate form of trap with the cover thereof removed; and FIG. 7 is a vertical sectional view taken substantially upon the plane indicated by the section 7—7 of FIG. 6.

DESCRIPTION OF THE PREFERRED EMBODIMENTS

Figure 2:
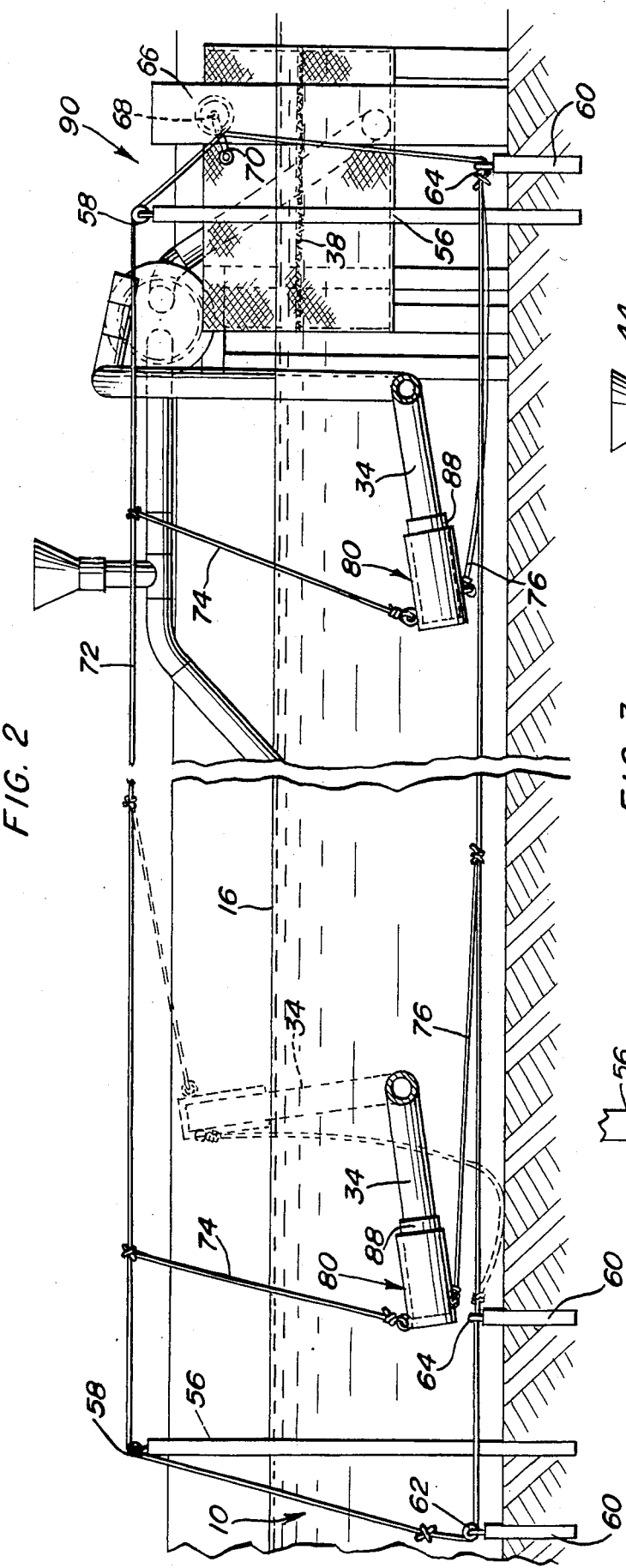
FIG. 2 is a fragmentary enlarged vertical sectional view illustrating two pivotable traps of the system and the structure by which the traps may be swung from lowered horizontal positions to raised upstanding positions.

Referring now more specifically to the drawings, the numeral 10 generally designates a pond including a bottom 12 and water 14 therein to a level 16 approximately two to three feet above the bottom 12. The trap system of the instant invention is referred to in general by the reference numeral 90 and includes an elongated conduit assembly referred to in general by the reference numeral 18 and including an inlet end 20 and a readily removably closable outlet end 22. The conduit assembly 18 includes four substantially parallel runs 24, 26, 28 and 30 which extend along the bottom 12 and each of the runs 24, 26, 28 and 30 includes a pair of sections 32 therein which are rotatable relative to the corresponding run and include lateral branches 34. The lateral branches 34 each may be swung between a lower generally horizontal position such as that illustrated in solid lines in the left-hand portion of FIG. 2 and a raised upright position such as that indicated in phantom lines in FIG. 2. When the lateral branches 34 are in the lowered positions, the outer or free ends of the branches 34 comprising the outlet end portions thereof closely overlying the bottom 12 and the inlet end portions of the lateral branches 34 open into the interiors of the sections 32 which are in turn in open communication with the corresponding runs 24, 26, 28, and 30.

A sump 36 comprising an upwardly opening wire mesh receptacle is positioned beneath the outlet end 22 and the inlet end 20 opens into the lower end of the sump 36, a removable wire mesh partition 38 being mounted within the sump 36.

Figure 3:
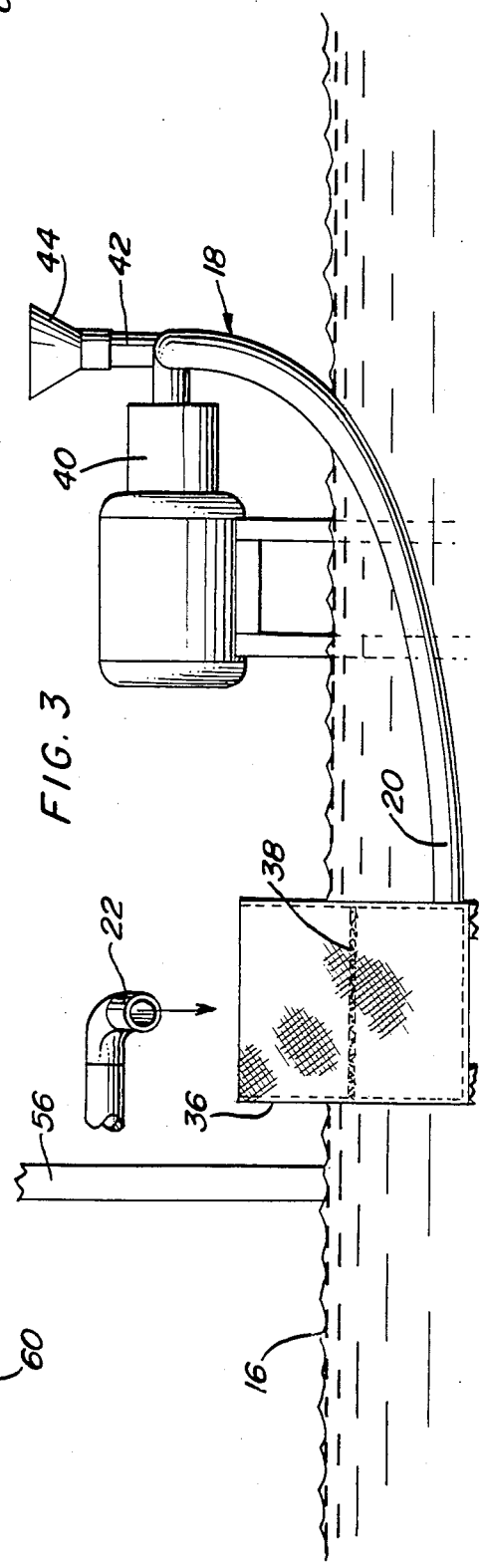
FIG. 3 is a fragmentary elevational view illustrating the baiting and marine life collecting sump as well as the adjacent inlet and outlet end portions of the conduit structure of the invention.

The sump 36 may be positioned relative to the level 16 in the manner illustrated in FIG. 3 of the drawings.

Figure 1:
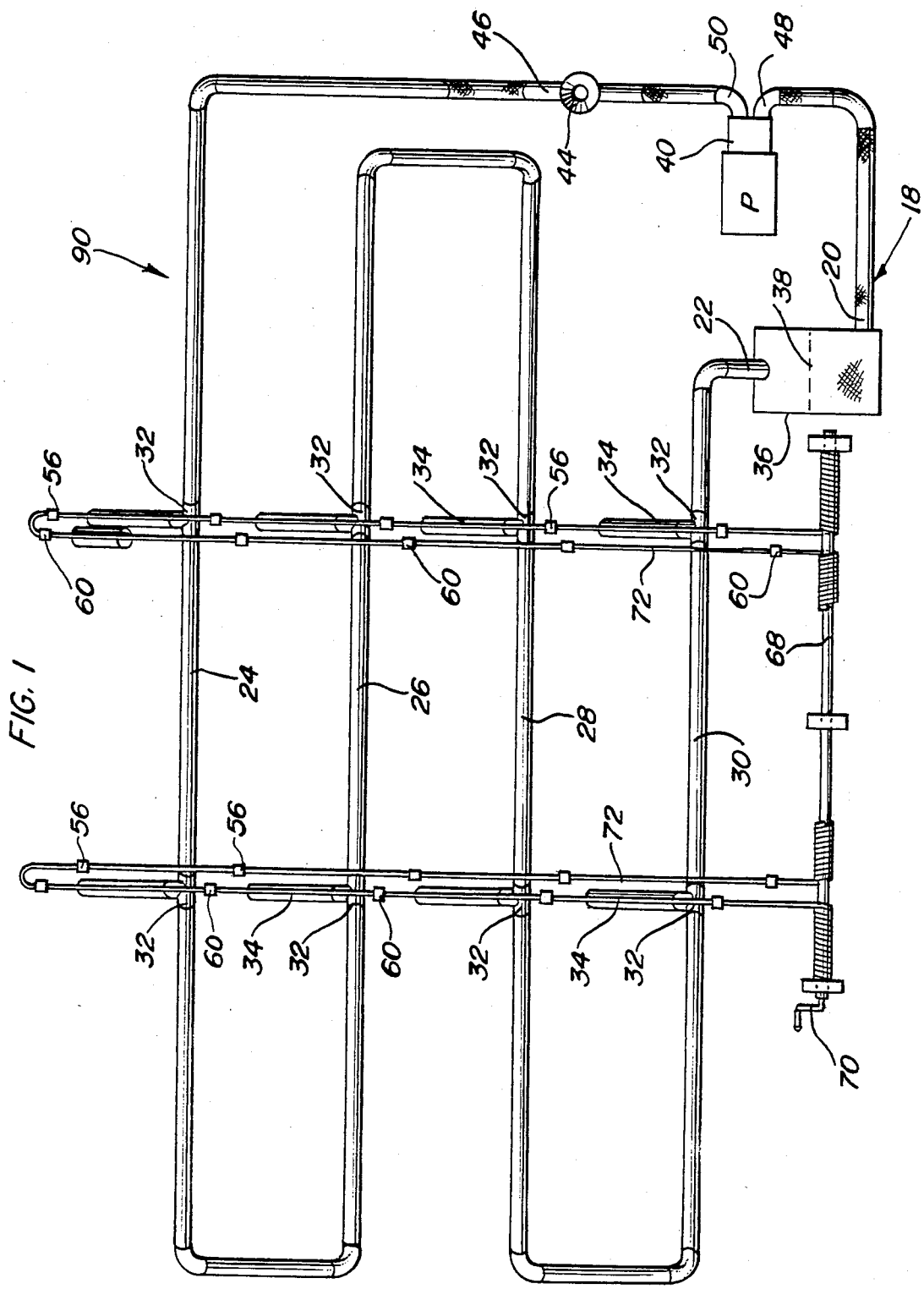
FIG. 1 is a top plan schematic view illustrating the trap system of the instant invention.

The conduit assembly 18 includes a motorized pump 40 serially connected therein intermediate the run 24 and the sump 36 and further includes an upwardly directed and opening bait inlet 42 terminating upwardly in a funnel portion 44, see FIGS. 1 and 3. The bait inlet 42 projects upwardly above the level 16, the section 46 of the conduit assembly 18 upwardly from which the bait inlet projects being disposed above the water level 16, as are the portions 48 and 50 of the conduit assembly 18 which open into and outwardly of the motorized pump 40.

A plurality of tall stakes 56 are provided and supported from the bottom 12. The upper ends of the stakes 56 support pulleys 58 therefrom and a plurality of shorter stakes 60 are supported from the bottom and include pulleys 62 and guide eyes 64 supported therefrom. Further, a post 66 is supported from the bottom 12 and rotatably journals a winding shaft 68 therefrom and includes a crank handle 70 on one end. A pair of flexible operating cables 72 are trained over and about the pulleys 58 and 62 and through the guide eyes 64. Opposite ends of the cables 72 are secured to and wind on the shaft 68 in opposite directions. Further, a plurality of lift cables 74 are connected between the cables 72 and the lateral branches 34 and a plurality of pull-down cables 76 are connected between the cables 72 and the lateral branches 34. Upon rotation of the shaft 68 in one direction, the pull-down cables 76 pull the lateral branches 34 down to the horizontal positions thereof illustrated in solid lines in FIG. 2 and rotation of the shaft 68 in the opposite direction allows the lift cables 74 to raise the lateral branches 34 from the lowered horizontal positions thereof to raised upwardly projecting positions such as that illustrated in phantom lines at the left side of FIG. 2.

With attention now invited more specifically to FIGS. 4 and 5 of the drawings, the free ends of the lateral branches 34 include removable end sections 88 having cover assemblies 80 secured thereover and each cover assembly 80 includes wire mesh funnels 82 on opposite sides thereof which open inward toward opposite side upper peripheral slot openings 84 formed in the lateral branches 34. In addition, with attention invited more specifically to FIGS. 6 and 7 of the drawings, modified lateral branches 34' may be provided with an alternate form of trap with opposite side mesh funnels 82' opening thereto. The free ends of the lateral branches 34' may be covered by cover assemblies corresponding to the cover assembly 80.

As an alternative, the equivalents of the stakes 56, 60, and 66 may be suspended from interconnected barges and the entire conduit assembly also may be suspended from barges, thereby enabling the entire trap system 90 to be moved from one location to another in a given body of water. Also, the various runs 24, 26, 28 and 30 may be removably interconnected and the cables 74 and 76 may be removably connected to the lateral branches 34 thereby enabling the conduit assembly 18 to be disassembled and moved to another location in which cables corresponding to the cables 72, 74 and 76 as well as a shaft corresponding to the shaft 68 are provided.

In operation, and assuming that the conduit assembly 18 is substantially filled with water, chopped-up mullet or other bait and rabbit food pellets or other food pellets may be introduced into the sump 36. The outlet end 22 may then be closed by a removable closure or cap (not shown) and the crank 70 may be operated to raise the lateral branches 34 to the phantom line position illustrated in the left-hand portion of FIG. 2. Thereafter, the pump 40 is actuated and water is drawn into the sump 36 through the sides thereof and subsequently into the inlet end 20 along with the bait previously dumped into the sump 36. The water containing the bait is then pumped through the conduit assembly 18 and into the upwardly projecting lateral branches 34 to the level 16. Then, operation of the pump 40 is terminated and the crank 70 is actuated to turn the shaft 68 in a direction whereby the cable 76 will pull the lateral branches 34 to the lowered generally horizontal positions illustrated in solid lines in FIG. 2. Some of the water within the conduit assembly 18, 24, 26, 28 and 30 and bait contained therein will escape the free ends of the lateral branches 34 and the covers 80 into the adjacent portions of the pond 10. Marine life will then be attracted to the bait and gradually move into the horizontal lateral branches 34 through covers 80 and the funnels 82 thereof or into the lateral branches 34' through the funnels 82' thereof and continue to feed on the bait within the water in the lateral branches 34. At any time, additional food may be admitted into the sump 36 and the pump may be operated for a short time. Thereafter, assuming a proper integral of time, the crank 70 is actuated to allow the cables 74 to pull the lateral branches 34 back to their upright positions. The marine life including crayfish or the like will then gradually descend in the lateral branches 34 and into the main runs 24, 26, 28 and 30 of the conduit assembly 18.

After the lateral branches 34 have been returned to their upstanding position, the outlet end 22 is opened and pump 40 is again operated. Thus, the marine life within the runs 24, 26, 28 and 30 will be forced through the conduit assembly 18 and out of the outlet end 22 thereof to be caught by the aforementioned partition 38 or other suitable receptacle disposed within at least the upper portion of the sump 36. After the trapped marine life has been collected, operation of the pump 40 may again be terminated, additional chopped food and pellets may be admitted into the sump 36, the outlet end 22 may be removably capped and the pump 40 may again be actuated to pump water through the conduit assembly 18 until such time as water and bait is discharged from the upper ends of the lateral branches 34 projecting above the level 16. Thereafter, operation of the motor 40 is again terminated and the lateral branches 34 are again returned to the horizontal positions thereof illustrated in FIG. 2.

By using four inch PVC pipe in constructing the conduit assembly 18 and the lateral branches 34, the cost of the system 90 may be maintained at a minimum. If the system 90 is to be used for trapping crayfish, the mesh of the sump 36 may be approximately one inch. However, other size pipe and mesh may be used for other forms of marine life. For example, larger pipe may be used together with larger funnels for trapping larger marine life such as lobsters.

The major advantage of the system 90 is that a selected marine life may be raised within a body of water, baited, trapped and conveyed to a collection point with a minimum of effort and expenditure of time.

If for any reason it is desired to admit larger pieces of bait into the system 90, the larger pieces of bait may be poured into the funnel 44 for downward passage through the bait inlet 42 and into the conduit assembly 18.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A hydromechanical bait trap system including conduit means having inlet and outlet ends, a sump, said inlet end opening into said sump below a predetermined liquid level therein, said outlet end discharging into said sump above said inlet end, said conduit means including at least one predetermined section thereof intermediate said inlet and outlet ends for positioning adjacent bottom level in a pond for raising marine life such as shrimp, crayfish and minnows, etc. and incorporating a lateral branch having inlet and outlet end portions, said inlet end portion opening into the interior of said section in at least reasonably good fluid-type sealed relation therewith and being mounted from said section for angular displacement relative thereto about an axis generally paralleling said section and with said lateral branch being swingable between a lowered generally horizontal position and a raised upstanding position with said outlet end portion uppermost, the affective length of said section being such to position said outlet end portion above the level of water in said pond when said lateral branch is in said upstanding position, selectively operable pump means serially connected in said conduit means downstream from said inlet end and upstream from said one section, the outlet end portion of said lateral branch including open trap means mounted therefrom, including structure for ready movement of marine life thereinto from said pond and being restrictive to movement of marine life from said trap means back into said pond.

2. The system of claim 1 wherein said conduit means includes a plurality of additional predetermined sections thereof spaced along said conduit means downstream from said one predetermined section and each of said additional sections includes a lateral branch corresponding to the first-mentioned lateral branch and opening into and swingable relative to the corresponding additional section between a lowered horizontal position and a raised upstanding position.

3. The system of claim 2 including control means operatively connected to said lateral branches for selectively simultaneously swinging said lateral branches between said lowered horizontal positions and said raised upright positions.

4. The system of claim 1 wherein said sump includes an upwardly opening receptacle including at least one upstanding mesh wall portion and said sump is adapted to be supported in a partially submerged position within the water of a pond.

5. The system of claim 1 wherein said receptacle includes a removable horizontal mesh partition supported therein above said inlet end of said conduit means.

6. The system of claim 1 wherein said outlet end includes structural features thereof adapting said outlet end to be removably closed.

7. The system of claim 3 wherein said control means includes a cable and cable winching assembly operatively connected to said lateral branches for raising and lowering the latter.

8. The system of claim 3 wherein said lateral branch open branch trap means are removably supported from the ends of said lateral branches remote from said first and additional predetermined conduit means sections.

9. The system of claim 8 wherein said sump includes an upwardly opening receptacle including at least one upstanding mesh wall portion and said sump is adapted to be supported in a partially submerged position within the water of a pond.

10. The system of claim 9 wherein said receptacle includes a removable horizontal mesh partition supported therein above said inlet end of said conduit means.

* * * * *